United States Patent [19]
Long

[11] 3,847,226
[45] Nov. 12, 1974

[54] WEEDER

[76] Inventor: Richard C. Long, 1303 Webb Rd., Lakewood, Ohio 44107

[22] Filed: Dec. 5, 1973

[21] Appl. No.: 421,999

Related U.S. Application Data

[63] Continuation-in-part of Ser. No. 208,587, Dec. 16, 1971, abandoned.

[52] U.S. Cl. ............................................... 172/371
[51] Int. Cl. ............................................. A01b 1/00
[58] Field of Search .................... 172/371, 378–381, 172/21–22

[56] References Cited
UNITED STATES PATENTS

| | | | |
|---|---|---|---|
| 698,715 | 4/1902 | Knight | 172/378 X |
| 1,182,918 | 5/1916 | McQuaide | 172/378 X |
| 1,185,581 | 5/1916 | Beymer | 172/381 |
| 2,279,747 | 4/1942 | Brandeberry | 172/378 |
| 2,373,898 | 4/1945 | Kulesh | 172/378 |
| 3,293,674 | 12/1966 | Sapia | 172/371 X |

*Primary Examiner*—Robert E. Bagwill
*Assistant Examiner*—R. T. Rader
*Attorney, Agent, or Firm*—Bosworth, Sessions & McCoy

[57] ABSTRACT

A weeder tool for lawns, gradens and the like, which is operated by hand and foot of a standing operator or user, and includes a rigid, formed and shaped, tapered blade, having a curved and sliding fulcrum, a step for the operator's foot, and a sharp, bifurcated tip for engaging the weed root. The weeder tool also comprises a handle, the pulling of the upper end of which toward the operator from a forwardly inclined position to an upright position, after having first pushed the tip and tongue of the blade into the ground by foot pressure on the step, advances the tip of the blade to the root of the weed and pivots the blade about its sliding fulcrum to break the ground adjacent the root crown, raise and break a divot, and push the weed, root and crown up and through the broken divot.

The angular relation between the handle, tongue and step of the blade is important to ease of operation. In order to have the tip and tongue of the blade enter the earth downwardly, swing to or toward the horizontal while pushing up the root and the divot, the upper end of the handle must move through a large arc in the opposite direction. It's intended to have the arc of the handle in a comfortable relation to the hand and arm of the standing operator.

5 Claims, 12 Drawing Figures

PATENTED NOV 12 1974 3,847,226

WEEDER

This is a continuation-in-part application of my prior and pending application, Ser. No. 208,587, filed Dec. 16, 1971, abandoned in favor of this application.

BACKGROUND OF THE INVENTION

1. Field of the Invention

The field of this invention comprises manual mechanical weeders which permit the operator to stand while extracting the weed, The field also comprises garden tools that function as light cultivators since weeders of the present invention raise divots which can be turned and broken up if the turf or other surface continuity is not intended to be preserved.

2. Description of the Prior Art

Hand-operated mechanical weeders for lawns, gardens, and the like, having a flat fishtail or claw-shaped blade for cutting or catching the weed root, and a straight or gently curved, elongated shank with a substantially cylindrical, axially extending handle are known in the art. The most relevant patents cited in the application parent to this one, and/or known to me, are, Kulesh U.S. Pat. No. 2,373,898 issued Apr. 17 1945 and Sapia U.S. Pat. No. 3,293,674 issued Dec. 27, 1966.

Neither of these patents teaches a single, one-piece, rigid blade having an earth penetrating tip and tongue, with a step for a human foot normal thereto, which tip and tongue can be pressed vertically down into the earth adjacent a weed while the handle of the weeder is included forwardly for rearward arcuate motion correlated to the soil, the depth of penetration thereinto and the size of the weed to be removed.

Sapia is largely concerned with providing a straight-two-edged sickle to be swung as a golf club is swung. The weed pulling aspect of his tool looks away from my invention to accomodate the sickle function and effect.

Kulesh has a multiple-bend, zig-zag blade that was never intended by Kulesh to penetrate deeply and be swung to lift weeds and divots for removal of the weeds and replacement of the divots.

SUMMARY OF THE INVENTION

It is, therefore, a general object of my invention to provide a new and improved weeder tool for use in lawns, gardens and the like, primarily to remove weeds and incidentally, to break up soil and cultivate the same.

Another object of my invention is to provide a new and improved weeder, for lawns, gardens and the like, which is fully operable by a user standing in an upright position.

Another object of my invention is to provide a new and improved weeder wherewith the weight of the user may be exerted by his foot to aid in inserting the weeder into the earth, and the user's foot may also be used to aid in control and work of the weeder during weed removal.

Further objects of this invention include the provision of a new and improved weeder which both severs and/or lifts the weed from the earth without requiring the user to stoop, kneel, or squat; which includes new and improved sliding fulcrum means whereby the blade of the weeder may be fulcrumed and advanced toward the weed with enhanced mechanical advantage for loosening the soil and detaching the weed therefrom.

In summary, my weeder is efficient and effective in use and operation; may be economically and conveniently manufactured, and is simple and rugged in construction and design. My invention provides for easily and automatically controlling the depth of blade penetration, lifts the weed and its root from the ground and separates them from the soil or divot part thereof. My weeder has a tapered or wedge-shaped blade having great width at its fulcrum and least width at its tip and may be operated to advance and swing the blade toward the weed root to push or lift the root and weed upwardly while lifting a divot with the loosened weed. My weeder may also be used to separate the weed from the divot before the divot is replaced.

These and other characteristics and advantages of my invention will become apparent from the following description of a preferred form thereof.

DESCRIPTION OF THE PREFERRED EMBODIMENT

A weeder embodying a preferred form of my invention is indicated generally at W, FIGS. 1 to 7 inclusive.

Figure 3:
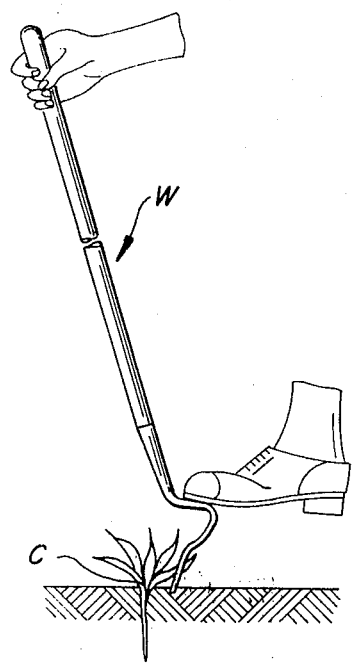
FIGS. 3 to 5, inclusive, are side elevations of the weeder shown in FIG. 1 depicting successive stages of the use thereof to remove a medium weed.

My weeder utilizes both hand and foot power, FIG. 3, so that work effort is utilized efficiently on the lever principle to increase the effectiveness of the operating forces, and includes moving fulcrum means in aid of blade penetration and weeder action.

Weeder W includes a blade 2 and handle means 4. Handle 4 includes a long shank portion 5 having the blade 2 mounted at the lower end of a grip portion 6 at the upper end, remote from the blade 2.

Shank 5 may comprise a substantially cylindrical wooden element like a mop handle, grip portion 6 is preferably an integral part thereof. Shank 5 may be formed of any desired strong, tough material, cf. FIGS. 8 and 9.

Figure 1:
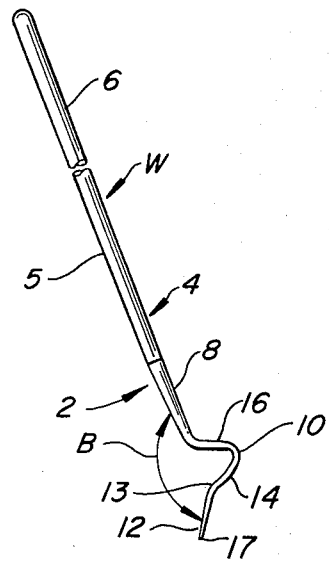
FIG. 1 is a side elevation of a weeder embodying a preferred form of my invention.

In the form of FIGS. 1-7, blade 2 is mounted on the handle 4 in a conventional plug and socket manner with a tapered socket 8 being formed in the blade 2 and a corresponding taper on the handle fitting and secured therein. The blade may be mounted on or connected to any handle in any other desirable way, see handle 7 mounted on blade 2a in FIGS. 8 and 9. The blade and shank structure details may be varied to effect such mounting, all within the scope and purposes of my invention. Preferably the center line of the handle 4 and connector 9 will intersect the blade between its fulcrum and its tip, substantially as depicted in FIGS. 1 and 9 herein. Blades 2 and 2a are the same except as to the socket 8 and connector 9, and are intended to function as rigid entities made of steel or other suitable strong material. In a full scale of my invention (FIGS. 8–12 are at 2/3 scale) the steel blades 2 FIGS. 1–7, and 2a, FIGS. 8–12 are three-sixteenths inch thick, about seven-eighths inch wide at the points of the bifurcated tip 17, taper to maximum width of about 2 inches at the curved juncture 10 of fulcrum 14 and step 16, and tapers down to about five/eighth inches round at the bottom of socket 8, FIGS. 1–7, and tapers down to about 1½ inches width where the step 16 joins the flat, connector 9, FIGS. 8–12 to which a tubular metal handle 7 is joined. In both forms, tongue 12 joins tip 17 to fulcrum 14. Handle 7 is flattened at its bottom end to lie snugly against the forward face of connector 9 and is conveniently attached to the forward face of connector 9 by U-bolt 18 and flat-headed screw 19 with appropriate nuts 20. Handle 7 and blade 2a comprise weeder W'.

Figure 10:
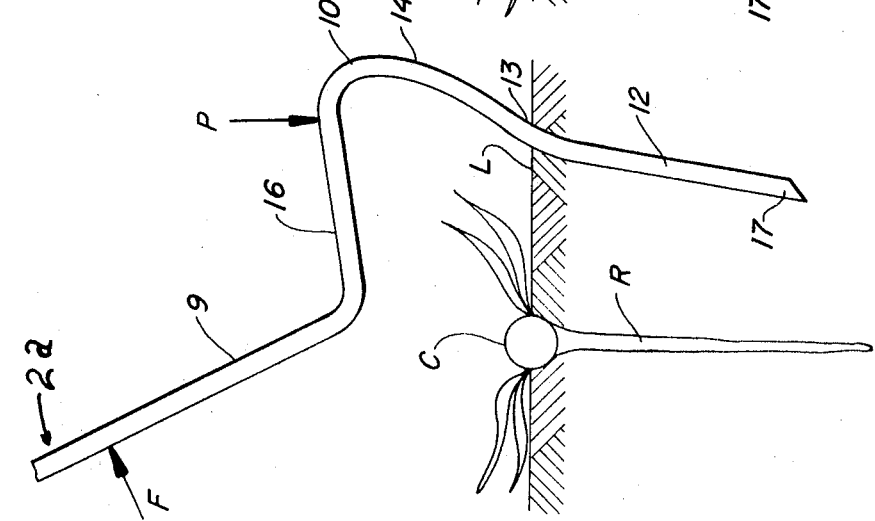

Tongue 12 is angularly related to socket 8 and connector 9, so that the handles each incline forwardly, from the point of view of the user, of a line perpendicular to the ground "behind" the weed when the weeder is first inserted in the ground, FIGS. 1, 3 and 10.

Tongue 12 is preferably first inserted into the ground at an angle slanting a little toward the root of the weed to be removed, inclined rearwardly from the vertical about 20°, FIG. 3 and about 10°–15°, FIG. 10.

The angle B between tongue 12 and the said center line of handle 4, FIG. 1 and between tongue 12 and connector 9, FIG. 9, is preferably between about 130° and about 150°. Handles 4 and 7 will be easily gripped within the convenient reach of the user when the blade is within about the said preferred angles for ground penetration mentioned above.

Holding the grip end of the weeder handle with the thumb uppermost, the weeder tip 17 is usually placed on the ground about 1 inch to 1½ inches from the root crown of the weed and facing toward it. The arm is extended forward so that the handle leans away from the operator at an angle over the weed and at arm's length. Now the foot is pressed on the step 16, FIGS. 3 and 10 to force tongue 12 into the ground, FIGS. 4 and 10. If the tongue is angled toward the root, it will be pressed at an angle into the ground and the tip 17 will approach the root. With the foot pressing down on the step and the arm pulling the handle back toward vertical position, FIGS. 6 and 11, it will be observed that the back end of the step will be moving downward toward the ground and that the curved periphery of fulcrum 14 will be sliding downward into the ground in an arc corresponding to the fulcrum's curve, FIGS. 5 and 11. The rise of a divot D and root crown C may begin to be noticed, FIGS. 5, 7 and 11. It can be visualized that the travel of tip 17 has been changed, swinging from downward to horizontal and then to upward, beginning its root lifting or pushing-up motion, and ending as suggested in FIGS. 5, 7 and 12.

Fulcrum portion 14 of blades 2 and 2a taken with step 16, FIGS. 1 and 9, is somewhat V-shaped with the rounded juncture 10 comprising a rounded blunt bottom of the V. Fulcrum portion 14 is gently curved, concave forwardly and joins tongue 12 in a smooth flowing juncture 13 which is concave rearwardly. Fulcrum 14 and juncture 13 are curved on noticeably greater radii than juncture 10. The preferred curves and proportions of both blades from socket or connector to tip are best shown in FIGS. 8–12.

Step 16 is so related to tip 17 of tongue 12 that the step is substantially parallel to the ground surface L FIGS. 3 and 10, when the tongue 12 is at the preferred angle, noted above, for insertion into the soil. The user, by a simple visual check of the step 16 can assure himself of proper placement of the blade tip 17 for soil penetration and correct motion toward the weed root.

During initial penetration the combined effects of the rotation of the handle about its own axis, swinging it about fulcrum 14 and continued penetration of the blade give the blade its forwrd and horizontal angular swinging motion toward the weed root and the lifting action to sever or abut and lift the weed root while pushing it toward and through the broken middle of the divot.

Figure 2:
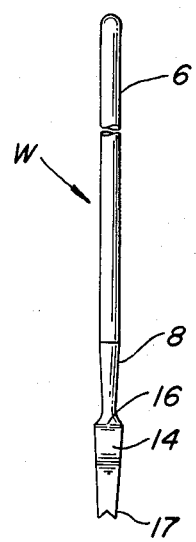
FIG. 2 is a rear elevation of the weeder shown in FIG. 1.
Figure 7:
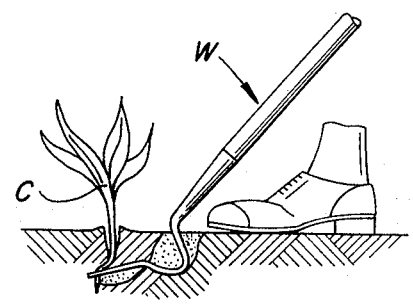
FIGS. 6 and 7 are broken side elevations, otherwise similar to FIGS. 4 and 5, showing the action of the weeder in use removing a larger weed requiring full penetration.
Figure 8:
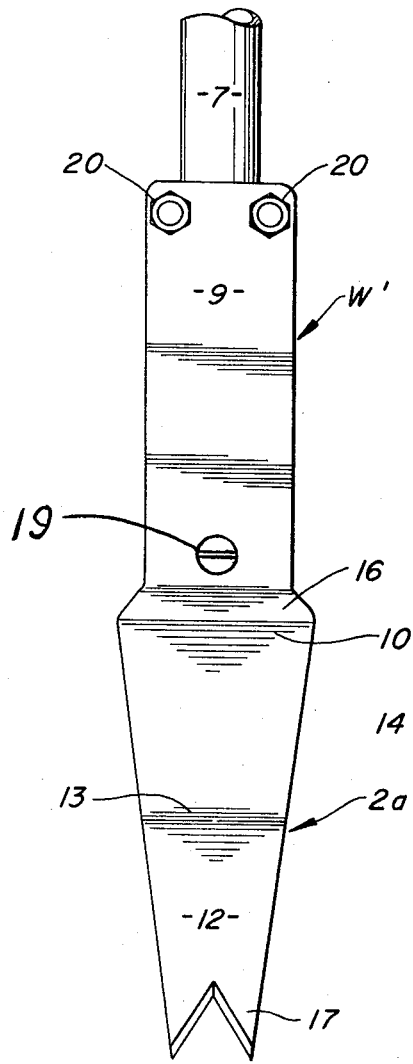
FIG. 8 is an enlarged rear elevation, at about two-thirds full scale, of a modified form of the blade of my weeder with a fragmentary part of the handle attached.
Figure 9:
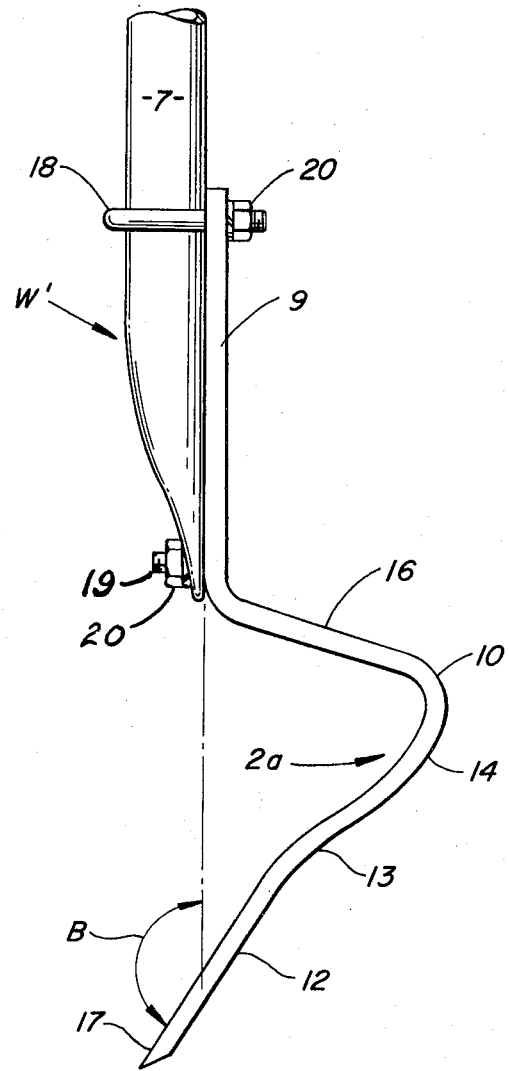
FIG. 9 is a side elevation of the weeder blade and handle of FIG. 8.

Blades 2 and 2a are preferably wedge-shaped, FIGS. 2 and 8, as described above. This structure facilitates plowing movement of tip and tongue through the ground during pivoting, thus pushing the weed and divot upwardly and severing of feeder and, if necessary, tap roots.

Tip 17 of tongue 12 is preferably bifurcated or formed in a fishtail, FIGS. 2 and 8 to facilitate penetration and severing and/or dislodgment of the weed by providing for portions of the blade to engage both sides of the weed root.

Figure 4:
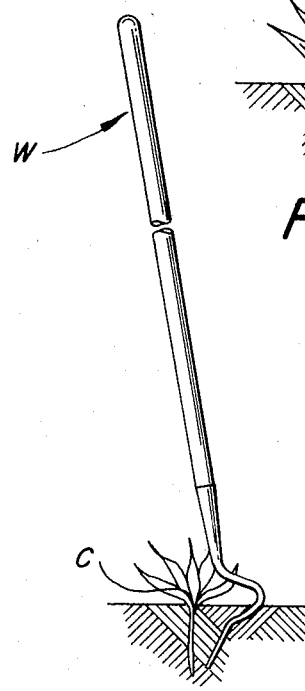
Figure 6:
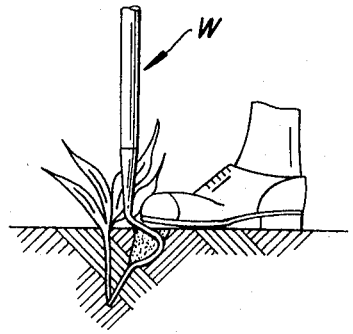
Figure 5:
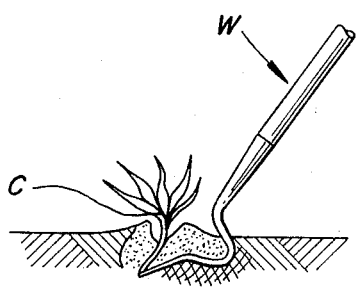

If the weed is relatively small, as shown in FIGS. 3 to 5, inclusive, tip of the blade may be located about one inch behind the weed and the weed is removed once the blade is in the position shown in FIGS. 4 and 5 by simply pulling back on the handle to fulcrum the weeder, and lift the weed and divot as shown in FIG. 5.

If, however, the weed is larger and the root extends deeper into the ground beyond the maximum practicable penetration of the blade therein, the user locates the blade a further distance behind the weed, depending on its size and soil conditions. In such instances, once the blade reaches the position shown in FIG. 6, the user continues to press downwardly on the blade while pulling on the handle until the blade penetrates to substantially its full depth while the rotating motion thereof lifts and shoves or crowds the weed root upwardly and away from the weeder blade, loosening the divot and loosening the weed from the divot, FIGS. 7 and 12.

Further swinging of the handle about fulcrum 14 will cause the step 16 to penetrate the ground moving the blade tip inwardly and upwardly as viewed, and further crowding or pushing the weed up and away from the weeder until it is completely loosened. The weeder may then be withdrawn and employed to knock the weed with its root crown and root out of the divot. The weeder may be used as a club, flicking the blade againt the weed to knock the weed away without further dislodging the divot which, in turn, is positioned fully in the ground by stepping thereupon.

When the handle is about vertical the tip 17 has moved under, or against, the root for a solid engagement that is forcibly continued throughout the rest of the tip travel. With the first slight lifting of the surface of the divot above the soil above the tip, there is a definite movement of the weed relative to the surrounding ground level because the tip has engaged the root and is pushing it up toward ground level. If no movement of the root crown is noticed, the tip has probably missed the root and needs to be realigned. The handle may then be moved forward to move the tip back from root area and by rotating the handle about its axis and steering with the toe, the tip may be re-aligned with the root.

Then pulling the handle back to vertical again will check for contact with and upward travel of weed.

The very penetration of the tip section itself as it is pressed close to and parallel to the root down into the soil does some breaking up and displacement of the soil and helps disengage the root and its feeders from the soil.

The pointed sections of the tip crowd and cut between root feeders, separating them and tearing them loose from the soil. The horizontal travel of the tip does the same work in a curved horizontal path, achieving much disengagement between the root, its feeders and the soil.

Soil conditions determine what form the divot D takes. At a sandy or wet extreme, simply a slightly raised mound of loosened soil results. And at the other extreme (if the soil contains a lot of clay and is dry) a broken piece, oval section divot may be formed. The usual result is roughly midway between these extremes resulting in some elevating of a somewhat packed and dry upper surface immediately ahead of and above the moving tip and tongue which press against the underside of the divot. Consequently further root and feeder disengagement from the soil and divot takes place during the remainder of the weeding cycle.

Keeping in mind that there are grass roots or other weed roots and feeders immediately adjacent to and/or extending into the divot area, it can be readily seen that the resistance they impose on a separation of a divot also contributes to a "forcible separation" that helps the disengagement of the weed, root and root crown from the divot. The resistance of the divot to being lifted, plus the tip pushing the weed root up against the under surface, and by compressing the undersurface, actually pushes the weed root part way up through the divot. That little movement observed at the upper surface of the divot of the weed rising out of the divot confirms the weeders' disengaging action.

At this point either the whole root is loosened and ready to be removed by the continuing action of the weeder or the snap can usually be heard of the root parting or severing at the weeders' tip well underground where there is no chance of root surviving.

If surface is originally well covered with grass, it still is after weed removal. The weeder does not travel any appreciable amount at ground level and only slightly increases the size of the hole made at entry point. It will be noted that the surface is little disturbed because the concave front face of the curved fulcrum "curves around" the edge of the divot, see FIGS. 11 and 12.

Figure 12:
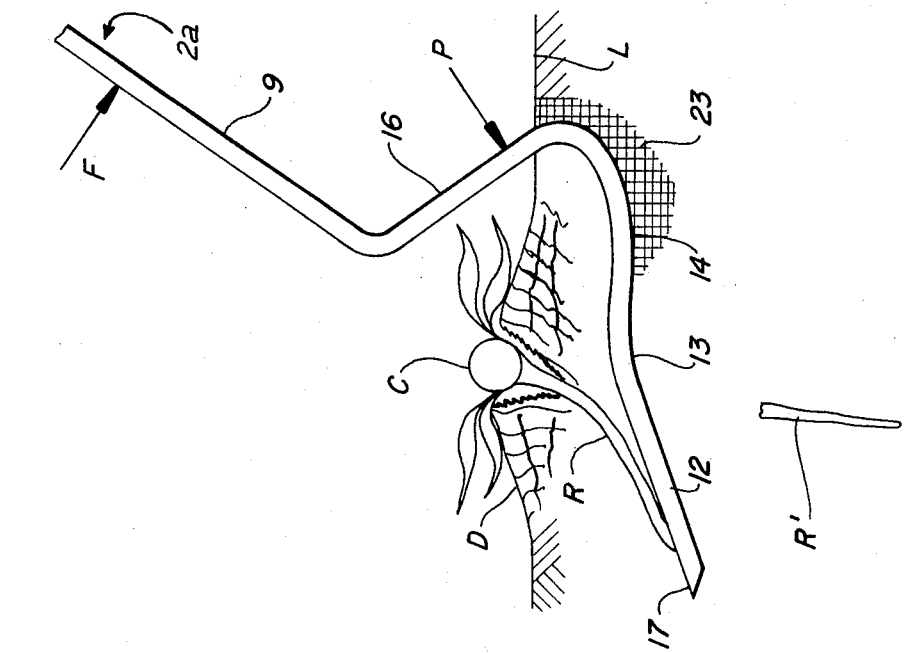
FIGS. 10, 11 and 12 are sequential views of the blade of FIGS. 8 and 9 intended to show on a large scale, illustrative steps of the action of the blade in the soil relative to a weed being extracted under the influence of the activating forces applied to the blade.
Figure 11:
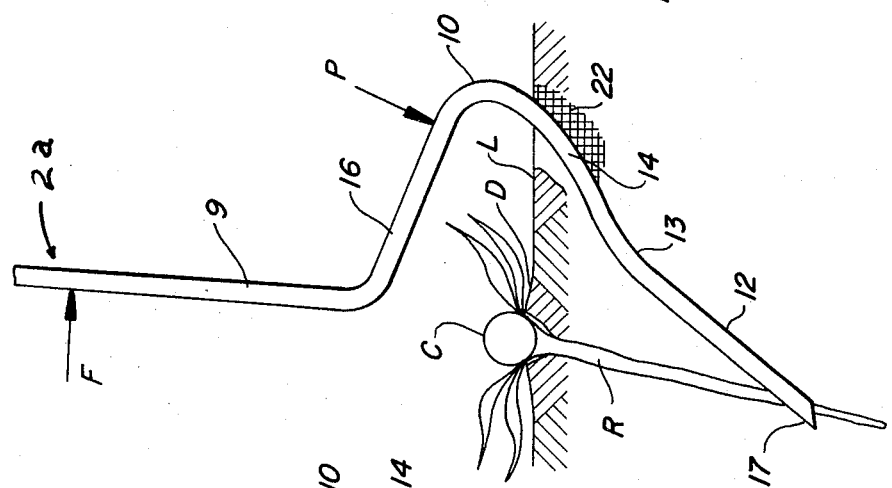

In FIGS. 10-12, it is intended to summarize visually on a larger scale the forces acting upon and the resulting actions of my weeder blade in the form of blade 2a of weeder W', FIGS. 8-9 employing the metal tubular handle 7.

The force F acting in the direction, but not magnitude, of the adjacent arrow, is exerted by handle 7 on connector 9 tending to rotate the blade clockwise about fulcrum 14 as viewed. Foot pressure P on step 16 is represented by the adjacent arrow approximately as to direction but not magnitude. The relations between the blade, the level L of the undisturbed soil, the root crown C and divot D are not intended to be the same as in FIGS. 1-7 since we may assume that soil conditions and weed and root structures may differ significantly from one uprooting situation to another.

In FIG. 10, foot pressure P has predominated vertically downward in the first instance to force tip 17 into the soil near root R, and hand-force F will have been exerted increasingly to the condition shown in FIG. 11, wherein fulcrum 14 is being pressed downwardly and rightwardly tending to compact the soil as suggested at 22 to support its sliding downward the leftward motion along with the sliding and clockwise, swinging motion of tongue 12 and tip 17. Tip 17, FIG. 11, has engaged root R and, with tongue 12, has begun to raise divot D and root crown C above ground level L. Foot pressure P has been angled as shown to promote the forward sliding component of motion of the tip, tongue, fulcrum and step of the blade.

In FIG. 12, a culmination of the weed lifting and release actions are suggested. The fulcrum 14 has compacted a greater mass of soil at 23. Pressure P is acting more nearly horizontally and hand-force F has progressed to approximately the end of its clockwise exertion, resulting in the lifted and broken divot D and the raised and loosened root crown C under the lifting action of tongue 12. Here it is suggested that tip 17 has severed root R, leaving a remnant to die in the soil as at R'.

Modifications, changes and improvements to the preferred and alternate forms of my invention herein specifically disclosed, may occur to those skilled in the art who come to understand the principles and precepts thereof. Therefore the scope of the patent to be issued hereon should not be limited to the particular embodiments of the invention set forth herein, nor in any manner inconsistent with the advance by which my invention has promoted the art.

I claim:

1. A manually operable weeder tool for removing weeds and their roots from lawns and turf by lifting the weed and root with a divot of the turf and removal of the weed and roots from the divot, comprising a rigid blade (2, 2a) and an attached handle (4, 7) with overlapping, connecting portions (8, 9) firmly connecting the upper end of the blade and the lower end of the handle, the blade having a forward face intended to face the weed to be pulled and comprising a straight, lower, earth-penetrating tongue portion (12) with a tip (17) adapted to engage, lift and separate the weed and root from the earth and divot, the said handle (4, 7) being inclined forwardly within the grasp of an operator when the tongue (12) of the blade stands vertically, said blade also comprising a step portion (16) joined at its forward end to said connecting portion (8, 9) and extending rearwardly toward the operator when the forward face of the blade faces the weed to be pulled, said blade also comprising a fulcrum portion (14) joined to said step with a rearwardly disposed rounded juncture (10) which forms the bluntly rounded apex of a V-shaped part of the blade comprising the step and fulcrum, said step lying at about right angles to the plane of the tongue (12) to facilitate downward entry of said tip and tongue into the earth under foot pressure on the step, said fulcrum having a convex rearward face and sloping downwardly and forwardly from its juncture (10) with the step and joining said tongue (12) in a curve (13) which is concave rearwardly, said fulcrum providing downwardly and forwardly sliding support for the blade tending to move said tip forwardly and upwardly into progressively tighter engagement with the root to lift, or lift and sever, the root after said fulcrum has engaged the earth and has been forced downwardly and forwardly while said handle is pulled rearwardly, said handle being long enough to be within easy grasp of a standing operator whose foot is bearing on the step of the blade.

2. The weeder tool of claim 1 wherein the blade tapers in width from about one inch at the tip to about two inches at the fulcrum.

3. The weeder tool of claim 1 wherein said handle and said tongue are inclined with respect to each other at an angle (B) measured on the forward side of the weeder of between about 130° and 150°.

4. The weeder tool of claim 1 wherein the load bearing area of said fulcrum is greater than the area of the tip and tongue, and wherein the load bearing area of said fulcrum is increased as the work of removing the weed increases.

5. The weeder tool of claim 4 wherein said tip is notched and sharpened whereby to engage and lift, or lift and sever, the root of the weed.

* * * * *